United States Patent [19]

Rockwell, III

[11] Patent Number: 5,009,483

[45] Date of Patent: Apr. 23, 1991

[54] OPTICAL WAVEGUIDE DISPLAY SYSTEM

[76] Inventor: Marshall A. Rockwell, III, 303 Grenola St., Pacific Palisades, Calif. 90272

[21] Appl. No.: 385,910

[22] Filed: Jul. 25, 1989

Related U.S. Application Data

[63] Continuation-in-part of Ser. No. 337,141, Apr. 12, 1989.

[51] Int. Cl.$^5$ .............................................. G02B 6/04
[52] U.S. Cl. ............................ 350/96.24; 350/96.25; 358/901; 40/547
[58] Field of Search .................. 350/96.1, 96.11, 96.12, 350/96.13, 96.14, 96.15, 96.16, 96.19, 96.24, 96.25; 358/901; 40/547; 362/32

[56] References Cited

U.S. PATENT DOCUMENTS

| | | | |
|---|---|---|---|
| 3,535,018 | 10/1970 | Vasilatos | 350/96.10 |
| 3,871,747 | 3/1975 | Andrews | 350/96.10 |
| 4,389,085 | 6/1983 | Mori | 350/96.10 |
| 4,422,719 | 12/1983 | Orcutt | 350/96.30 |
| 4,576,436 | 3/1986 | Daniel | 350/96.10 |
| 4,763,984 | 8/1988 | Awai et al. | 350/96.24 |
| 4,822,123 | 4/1989 | Mori | 350/96.10 |
| 4,845,596 | 7/1989 | Mouissie | 362/32 |
| 4,936,663 | 6/1990 | Mori | 350/96.15 |

OTHER PUBLICATIONS

M. Gottlieb & G. B. Brandt, "Temperature Sensing in Optical Fibers Using Cladding & Jacket Loss Effects", Nov. 15, 1981, vol. 20, No. 22, Applied Optics.

J. R. Hill & P. Pantelis, "Demonstration of the Linear Electro-Optic Effect in a Thermopoled Polymer Film", Sep. 1, 1988, J. Appl. Phys., 64, pp. 2749-2751.

J. R. Hill & P. Pantelis, "Synthesis & Use of Acrylate Polymers for Non-Linear Optics", Dalton Division of the Royal Chemistry Society, Oxford, Jun. 29th-30th, 1988.

E. A. Chandross, "Photolocking—A New Technique for Fabricating Optical Waveguide Circuits", Appl. Phys. Lett., vol. 24, No. 2, Jan. 15, 1974, pp. 72-74.

Takashi Kurokawa, "Polymer Optical Circuits for Multi-Mode Optical Fiber Systems", Sep. 15, 1980, Applied Optics, vol. 19, No. 18, pp. 3124-3129.

M. Haruna, "Thermooptic Deflection & Switching in Glass", Oct. 1, 1982, vol. 21, No. 19, Applied Optics, pp. 3461-3465.

D. R. Ulrich, "Overview: Non-linear Optical Organics & Devices", Organic Materials for Non-Linear Optics, Royal Chem. Soc., Oxford, Jun. 1988.

R. Lytel, "Advances in Organic Electro-Optic Devices", SPIE, vol. 824, Advances in Non-Linear Polymers, 1987, pp. 152-161.

James L. Fergason, "NCAP Technology Report: Section 2", 1989, Taliq Corporation, Sunnyvale, CA. 94089.

*Primary Examiner*—Frank Gonzalez

[57] ABSTRACT

A thin-panel, large, high-definition television screen employs optical waveguides. Light (32) flows through waveguides (28) arranged, in parallel, across a substrate (64). Light from a source (44) is coupled into the waveguides using a Graded Index (GRIN) microlens array (56). Taps (37) direct light out and make it visible at different locations along the length of the waveguides. Long interaction length (8) taps with reflectors (10) are introduced which enable many waveguides to be staggered and placed side-by-side to maintain high screen resolutions. Polymers, both electro-optic and non-electro-optic, are used in the preferred embodiment as a waveguide building material. However, acousto-optic, thermo-optic (86) and magneto-optic effects may also be used with other materials such as glass and silicon dioxide. This display can be economically produced by forming a flexible waveguide ribbon (62) which integrates multiple waveguides (1), intensity modulators (40) and taps (38) into a single unit. Waveguide display manufacturing techniques based on thermo-poling (100), photolocking (114), extrusion (124), and preform fiber-drawing (132) are also presented.

23 Claims, 8 Drawing Sheets

OPTICAL WAVEGUIDE DISPLAY SYSTEM

BACKGROUND OF THE INVENTION

1. Field of the Invention

This invention is a continuation-in-part of the pending patent application entitled "Optical Waveguide Display System" filed Apr. 12, 1989 and which has U.S. Pat. Ser. No. 337,141 (still pending). The parent application describes how to switch guided light out of an optical waveguide. Images are formed by systematically switching light out of many parallel waveguides arranged, side-by-side, on a substrate.

2. Prior Art

The prior application details how to switch (tap) guided light out from a waveguide core with sound. Sound is generated by separate transducers oriented alongside the length of a waveguide. Sound waves interact with guided light via the acousto-optic effect. Changes in the waveguide refractive index create light emitting regions at different locations where individual transducers are placed along the length of the waveguide. By using many transducers, and many parallel waveguides, images can be formed on a viewing screen.

Recently, research has revealed a number of limitations inherent in the acousto-optic display method. First, acoustic taps have high electrical drive power requirements because sound must be continuously generated to operate the tap. Typically, sound from a transducer propagates perpindicularly to the direction of light flow through a waveguide core. This sound passes through the waveguide core and is absorbed by material on the other side of the waveguide. Sound traveling beyond the waveguide core does not interact with guided light. Consequently, since most of the acoustic energy travels into non-core regions, sound must continuously be generated by the transducer to operate the tap. This is wasteful, hence the energy requirements of acoustic taps are high.

Second, optical waveguide displays have low resolutions due to the long acousto-optic tap interaction lengths that are needed to efficiently switch light out of the waveguide. The interaction length is the distance light must travel through a waveguide tap before exiting from the core. The screen resolution, as described in the prior application, is determined by the number of consecutive taps which can be placed along the length of a single waveguide. Thus, the longer the tap interaction length, the fewer the number of taps which can be arranged along a given length of waveguide. The acousto-optic tap interaction length is presently estimated to be $\approx 10$ cm.

The third major disadvantage to acousto-optic taps is the small degree with which sound can change the waveguide refractive index. Sound can induce refractive index changes in silicon dioxide and other commonly used waveguide materials on the order of $\Delta n \approx 10^{-5}$. Because this refractive index change is extremely small, waveguides must be specially designed so waveguide taps can function with small acousto-optic effects.

Waveguides suitable for use in conjunction with acousto-optic taps are constructed by making the cladding layer surrounding the core very thin. A thin cladding layer allows the evanescent field of core guided light to interact with materials outside the cladding. A small refractive index change in a thin cladding waveguide shifts the evanescent field of the guided light out beyond the cladding. Once outside the cladding, guided light is scattered, or refracted, so it can be seen by a viewer.

Presently, the light guiding ability of a thin cladding waveguide changes when it is exposed to different temperature conditions. A thin cladding waveguide which guides light well at a low temperature will have an increased attenuation at higher temperatures. This increased attenuation is caused by the large refractive index change induced by the thermo-optic effect. For example, a temperature difference in glass of only 20° C. causes a change in $\Delta n > 10^{-5}$. This thermo-optic refractive index change is larger than the highest attainable acousto-optic refractive index change. Consequently, a thin-cladding waveguide used in conjunction with acoustic taps is very sensitive to thermal conditions and can only operate in an environment where the temperature is carefully controlled.

Art related to this invention is disclosed by M. Gottlieb and G.B. Brandt, "Temperature sensing in optical fibers using cladding and jacket loss effects", *Applied Optics*, Vol. 20, No. 22, Nov. 15, 1981, pp. 3867–3873; M. Gottlieb et. al "Measurement of Temperature with Optical Fibers", *ISA Transactions*, Vol. 19, No. 4, pp. 55–62; J. R. Hill et. al., "Synthesis and Use of Acrylate Polymers for Non-linear Optics", *Organic Materials for Non-linear Optics*, Royal Society of Chemistry - Dalton Division, Oxford, 29–30 June 1988, pp. 405–411; J. R. Hill et. al., "Demonstration of the linear electro-optic effect in a thermopoled polymer film", *J. Appl. Phys.*, Vol. 64, No. 5, Sept. 1, 1988, pp. 2749-2751; E.A. Chandross et. al., "Photolocking - A new technique for fabricating optical waveguide circuits", *Appl. Phys. Lett.*, Vol. 24, No. 2, Jan. 15, 1974, pp. 72–74; Hilmar Franke, "Optical recording of refractive-index patterns in doped poly - (methyl methacrylate) films", *Applied Optics*, Vol. 23, No. 16, Aug. 15, 1984, pp. 2729–2733; Takashi Kurokawa, "Polymer optical circuits for multimode optical fiber systems", *Applied Optics*, Vol. 19, No. 18, Sept. 15, 1980, pp. 3124–3129; M. Haruna and J. Koyama, "Thermooptic reflection and switching in glass", *Applied Optics*, Vol. 21, No. 19, Oct. 1, 1982, pp. 3461–3465; Andrew J. Lovinger, "Ferroelectric Polymers", *Science*, Vol. 220, No. 4602, June 10, 1983, pp. 1115–1121; D. Bosc and P. Grosso, "Polymer acousto-optic modulator working at 20 Mhz", 2nd International Conference on Passive Components: Materials, Technologies, Processing, Paris, France, Nov. 18–20, 1987, pp. 107–112; D. R. Ulrich, "Overview: Non-linear Optical Organics and Devices", *Organic Materials for Non-linear Optics*, Royal Society of Chemistry - Dalton Division, Oxford, June 29–30, 1988, pp. 241–263; Brettle et. al., "Polymeric non-linear optical waveguides", SPIE Vol. 824 Advances in Nonlinear Polymers and Inorganic Crystals, Liquid Crystals, and Laser Media (1987), pp. 171–177; R. Lytel et. al., "Advances in organic electro-optic devices", SPIE Vol. 824 Advances in Nonlinear Polymers and Inorganic Crystals, Liquid Crystals, and Laser Media (1987), pp. 152–161; NCAP Technology Report, Taliq Corporation, Sunnyvale CA.

SUMMARY OF THE INVENTION

Objects of the Invention

Accordingly, it is an object of this invention to show an improved electroptic tap for use in optical waveguide display systems.

Another object is to show an improved waveguide tap comprising a long interaction region and a light reflecting element.

Yet another object is to show a staggered, multi-waveguide, tap-arrangement method which enables high screen pixel resolutions to be maintained while using long interaction length taps.

A further object is to show waveguide manufacturing techniques based on thermo-poling, photolocking, extrusion and preform/furnace fiber drawing.

Another object is to show a Graded Index (GRIN) microlens focusing method for efficiently guiding light from a source into many waveguide core elements.

Yet another object is to show how to use broad-spectrum light to produce color display images in optical waveguide displays.

Still another object is to show a new type of thermo-optic waveguide tap.

These and additional objects, features and advantages of the present invention will become more obvious from the following description when taken in connection with the accompanying drawings.

Brief Description

The invention comprises a number of improvements in the individual elements required to construct an optical waveguide display. For example, a new long interaction length waveguide tap based on electroptic effects is detailed. Also, a focusing element which directs light from the source into the waveguide cores is introduced. Finally, polymer processing techniques are described which make waveguide displays less expensive to manufacture. Taken together, these improvements enable large flat panel screens to be economically produced.

A new type of waveguide tap structure is introduced. In the tap interaction region, guided light is coupled through the cladding, from the core, into a second waveguide running alongside the cladding. The second waveguide, hereinafter referred to as the "supercladding", guides light in a direction oriented parallel to the core. Light coupled out from the core travels through the supercladding until it hits a small reflector formed in the supercladding. The reflector, in turn, directs light out of the supercladding to the viewer. Thus, light coupled into the supercladding from the core over a long interaction length appears as a small light emitting region located at a supercladding reflector.

The supercladding/reflector tap structure enables high screen resolutions to be maintained while using long interaction length taps. To maintain a high screen resoltion multiple waveguides are placed, side-by-side, next to each other. Each waveguide still contains a small number of long interaction length supercladding/reflector taps. However, the reflectors on separate waveguides are slightly offset, or staggered, to achieve a higher resolution. The combined effect of many parallel waveguides, each with their limited number of staggered taps, increases the display resolution.

Another important innovation is an energy efficient tap design which uses electro-optic effects. Electro-optic materials change their index of refraction in an electric field. By using electro-optic materials to construct the waveguide core, cladding and/or supercladding elements the amount of power needed to drive the taps, and hence the screen, is lowered. Non-linear and ferroelectric polymers are presently considered the best electro-optic waveguide building materials.

An entirely different type of tap based on thermo-optic effects is also described. Thermo-optic taps comprise a heating element placed in close proximity to the waveguide core, cladding and supercladding. The heating element causes the index of refraction in these waveguide layers to change at different rates. Slight differences in the refractive index rate of change in separate waveguide layers force light to couple out of the core and into the supercladding. Thermo-optic taps are simple to fabricate and have excellent environmental stability.

Improvements in the light-source-to-waveguide-coupling elements are also presented. Graded Index lenses (GRIN) reduce a collimated beam of light to a very small size. Multiple GRIN lenses are used to efficiently focus light from a source into the many waveguide core elements used in the display.

Finally, plastic waveguide processing techniques are described which enable large numbers of waveguides to be economically manufactured. Plastics can be extruded, molded, laminated, etched, doped, drawn, stamped, machined, thermo-poled and photolocked to form optical waveguides. Optical waveguides can be mass produced using these manufacturing techniques at a low cost.

The attainment of the foregoing and related objects, features and advantages of the invention will be more readily apparent to those skilled in the art, after review of the following detailed description of the invention, taken together with the included drawings.

DRAWING REFERENCE NUMBERS

1 Optical waveguides
2 Width of a single waveguide
3 All of the waveguides with staggered taps which make up a vertical column
4 Reflector spacing when more than one waveguide is in a column 3
6 Reflector spacing when a single waveguide is used for column 3
8 Tap interaction region (i.e. - where light is coupled from the core into the super cladding)
10 Reflector region (i.e. - where light is directed out of the supercladding to the viewer)
12 Direction of light flow through the waveguide
14 Ground
16 DC voltage
18 Signal conductor
20 Ground conductor
21 Ground conductor for intensity modulators
22 Cladding
24 Thin-layer cladding (i.e. - electro-optic material)
25 Waveguide isolation layer (clear optical, metallic or opaque material)
26 Supercladding (i.e. - electro-optic material)
28 Core
30 Direction of light reflected out of supercladding to the viewer
32 Light exiting the end of the waveguides
34 Dark layer to improve screen contrast ratio
36 Intensity modulator ribbon reflector elements
37 Tap conductor element extends to edge of ribbon
38 Staggered tap fingers define a vertical column 3
39 Reflector regions on ribbon direct tap supercladding light to the viewer
40 Interaction region 8 for intensity modulators
41 Intensity modulator spacing
42 Large size bonding pads associated with intensity modulators
43 Intensity modulator electrode
44 Light source
46 White light from source 44
48 Collimating focusing optics
50 Collimated white light
52 Light coloring element
54 Colored light
56 Focusing lens (GRIN) to direct collimated and colored light 54 into the ribbon cores
58 Focused light entering ribbon stack 60
60 Stack of waveguide ribbons
62 Bend regions where each ribbon in the stack is folded over and arranged across the substrate
64 Screen substrate
66 Individual ribbons
67 Light exiting the end of the ribbons
68 Clear viewing window in substrate so light can make it from the ribbon reflectors 39 to the viewer
70 Gap between separate ribbons taps - usually made conductive
72 Heating element
74 Optical buffer for separating thermal heating element 72
76 Substrate material (also cladding)
78 Core
80 Light confined in core
82 Light coupled into supercladding
84 Supercladding
86 Heated region
88 Thin cladding between core and supercladding
90 Electronics to control the intensity modulators
92 Electronics to control the taps
94 Controller which provides information and synchronizes the tap and intensity modulators to form complete screen images
96 Electrode brushes contacting the ribbon electrodes to pole waveguide regions into the ribbon
98 Heat
100 Thermo-poled waveguides formed in the plastic sheet
102 Direction ribbon moves through processing machine
104 Direction ribbon on spool rotates
106 Unprocessed ribbon on the spool
108 Ribbon before it encounters the waveguide processing step
110 Photolocking light source to expose waveguide regions in the ribbon
112 Light beams passing through ribbon 108 to expose the waveguide regions
114 Waveguide regions formed by heating the plastic material 108
116 Rollers
118 Extrusion die
120 Melted optical grade plastic or glass
122 Vesicle containing melted optical waveguide material
124 Waveguides formed by extrusion
126 Fiber preforms before heat-drawing
128 Furnace to melt and stretch prefroms
130 Direction preform is passed through the furnace 132 Waveguide preforms being heated, stretched and reduced to a smaller size

DETAILED DESCRIPTION OF THE INVENTION

Waveguide Taps

Figure 1A:
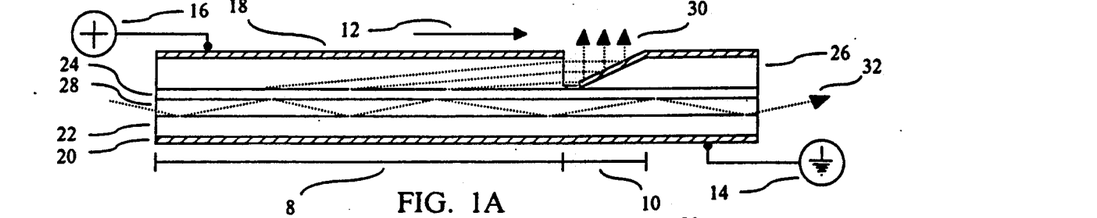
FIG. 1A is a side view of a waveguide tap showing how light is coupled out of a core into a supercladding and reflected out to the viewer.
Figure 1B:
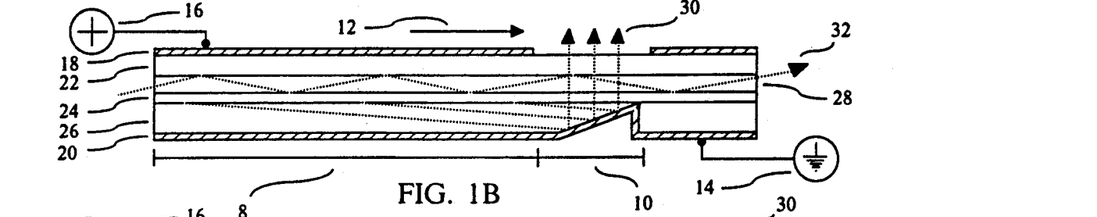
FIG. 1B is a side view of waveguide tap showing how light is coupled out of a core into a supercladding, reflected back through the waveguide core, and directed out to the viewer.
Figure 1C:
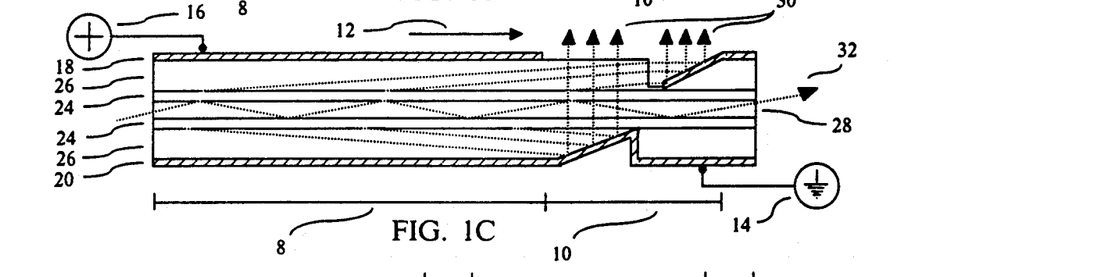
FIG. 1C is a side view of a waveguide tap showing how light is coupled out into two supercladdings placed on each side of a waveguide core, reflected from the front and reflected back through the waveguide core, and directed out to the viewer.

Turning now to the drawings, more particularly FIGS. 1A-1C, which show side views of three different long interaction length waveguide taps. The taps shown in these diagrams employ the electro-optic effect. However, long interaction length taps based on acousto-optic, thermo-optic and magneto-optic effects may also be constructed based on the ideas presented in the following sections. It is strongly intended that long interaction length taps which use these other effects be included within the scope of this discussion.

FIG. 1A shows light 32 traveling through a waveguide core 28. The tap is controlled by applying a voltage difference between conductors 20 and 18. The electric field produced by the voltage difference induces the electro-optic material in the tap interaction region 8 to change its index of refraction. Changes in the waveguide refractive index allow light to exit the core and enter into the supercladding 26.

Light travels through the transparent supercladding until it hits a reflector. FIGS. 1A-1C show three angled reflector regions 10 formed in the supercladding. The reflector redirects light out 30 of the supercladding so it can be observed. The reflector is preferably formed by etching a pit in the supercladding. The pit is partially metalized, so that supercladding light entering the pit is blocked and reflected out of the supercladding 30. All the light traveling through the supercladding hits a reflector and is directed out 30 to the viewer. The interaction length 8 plus the reflector region length 10 equals the total length of a tap.

FIG. 1B shows light 30 being reflected out through the waveguide core 28 and cladding 22 layers. As in FIG. 1A, light is coupled out into the supercladding 26 in the interaction region 8. However, instead of being reflected 30 directly to the viewer, light in the supercladding 26 must first pass through the cladding 22 and core 28 layers.

FIG. 1C shows a hybrid combination of the taps shown in FIGS. 1A and 1B. Two supercladdings 26, one on either side of the core, carry light tapped out in the interaction region 8. By using two supercladdings the interaction length 8 needed to couple light out from a waveguide core 28 is decreased. Light evanescently interacts more strongly with the supercladdings 26 because there are two thin-claddings 24 arranged on each side of the core 28. Reflectors formed in both supercladdings 10 direct light to the viewer 30.

The preferred core-to-supercladding coupling mechanism uses the evanescent field of the core guided light. Guided light can interact with materials placed near the cladding and core via its evanescent field. Evanescent field interactions allow very slight refractive index changes to efficiently tap guided light out of the core and into the supercladding.

The supercladding is preferably made of a material with a higher index of refraction than the core. A high supercladding index of refraction causes light coupled into the supercladding to be angled away from the core. Angling light away from the core causes it to be more centrally located in the middle of the supercladding. This makes it is easier to remove light at a reflector region 10 since the reflector pit does not need to be formed as deeply in the supercladding 26 to remove the centrally located supercladding light.

Either the cladding, core, and/or supercladding may be made of electro-optic materials. In one embodiment only the cladding 24 is made of an electro-optic material. A voltage difference 16 applied to the electrodes causes the electro-optic cladding 24 to increase its index of refraction. Increasing the cladding refractive index forces guided light to interact with the supercladding 26. Light is stripped out of the core and travels through the supercladding 26 until it hits a reflector region 10.

In a different tap embodiment, an electro-optic supercladding 26 can be made to act as part of a non-electro-optic cladding. In this configuration, the evanescent field of light in the waveguide core extends through the cladding into the supercladding. When the tap is "off", the supercladding has an index of refraction approximately equal to the cladding. In the "off" state, the supercladding and cladding collectively act to guide light through the waveguide. In other words, the cladding alone is not enough to confine and guide light through the waveguide core.

However, when the tap is switched "on" the refractive index of the electro-optic supercladding increases. This refractive index increase couples light out from the waveguide core into the supercladding. Light travels through the electro-optic supercladding until it hits a reflector 30.

Forming only the supercladding out of an electro-optic material has the advantage that the core and cladding layers can be made from traditional non-electro-optic waveguide materials. Very low loss non-electro-optic materials have been developed which are capable of guiding light long distances, typically 100 meters or more, with little attenuation. On the other hand, electro-optic waveguide materials presently have optical losses in the range of 1 dB/cm. If the core and cladding were made of currently available electro-optic materials, attenuation of light in the waveguide would be prohibitively high.

To reduce loss, the waveguide is designed so only a small fraction of the guided evanescent wave extends past the cladding into the electro-optic supercladding. Most of the light in the waveguide travels through the non-electro-optic core and cladding. Only the small fraction of guided light which actually extends into the electro-optic supercladding is more highly attenuated. Thus, high loss electro-optic materials can still be used to build display waveguides.

There are other ways to use electro-optic materials to tap light out of optical waveguides. Diffractive and/or refractive effects may also be employed. For example, the core can be made of alternating layers of electro-optic and non-electro-optic materials. (not shown) In the absence of an electric field, the electro-optic and non-electro-optic layers are chosen so they have the same index of refraction. However, when an electric field is applied to the waveguide, an increase in the index of refraction in the electro-optic core layers causes an irregular core refractive index. Diffraction and refraction effects caused by this irregular core refractive index force light to exit into the supercladding.

It is possible that a single supercladding reflector 10 will not be sufficient to deflect out all of the light in the supercladding 26. It is important that the reflector remove all of the light in the supercladding, otherwise, light will continue through the supercladding and be reflected at the next reflector. Light leaking between consecutive waveguide supercladding reflectors distorts the screen image. To prevent light leakage, multiple reflectors (not shown) may be placed close next to each other. A plurality of closely spaced reflectors in region 10 will insure all of the supercladding light is removed and directed to the viewer 30.

Other reflector-like means may also be used to remove supercladding light. For example, a diffusing material containing small scattering centers may be used to re-fill a supercladding reflector pit. Light interacting with the many small scattering centers will be redirected out of the supercladding. Other light re-directing means based on lenses, pigments, and dyes can also be used. In general, anything which scatters, absorbs, deflects, refracts or blocks supercladding light can be used in a reflector region 10.

It should be mentioned that long interaction length 8 taps are relatively tolerant to irregularities encountered during the manufacturing process. The performance of long interaction length taps degrades gracefully due to their long length. Interaction lengths 8 typically will vary from 0.1-20 cm. This is much longer than the core and cladding dimensions which will typically be in the micron range. As a result, small irregularities in optical materials and the waveguide core and cladding dimensions have minimal effects on the performance of the waveguide tap.

Figure 5A:
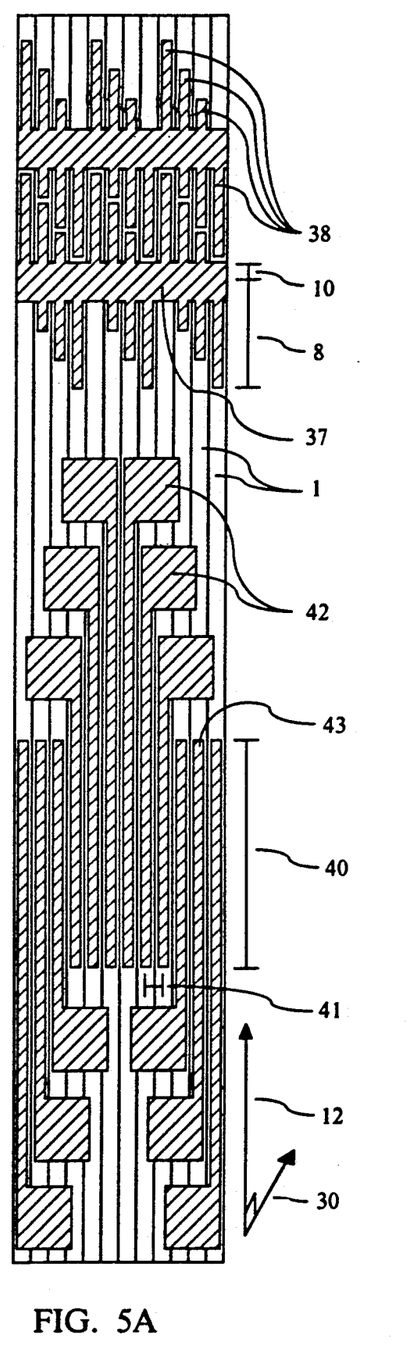
FIG. 5A is the back of a waveguide ribbon which shows the intensity modulator and tap electrodes.
Figure 5B:
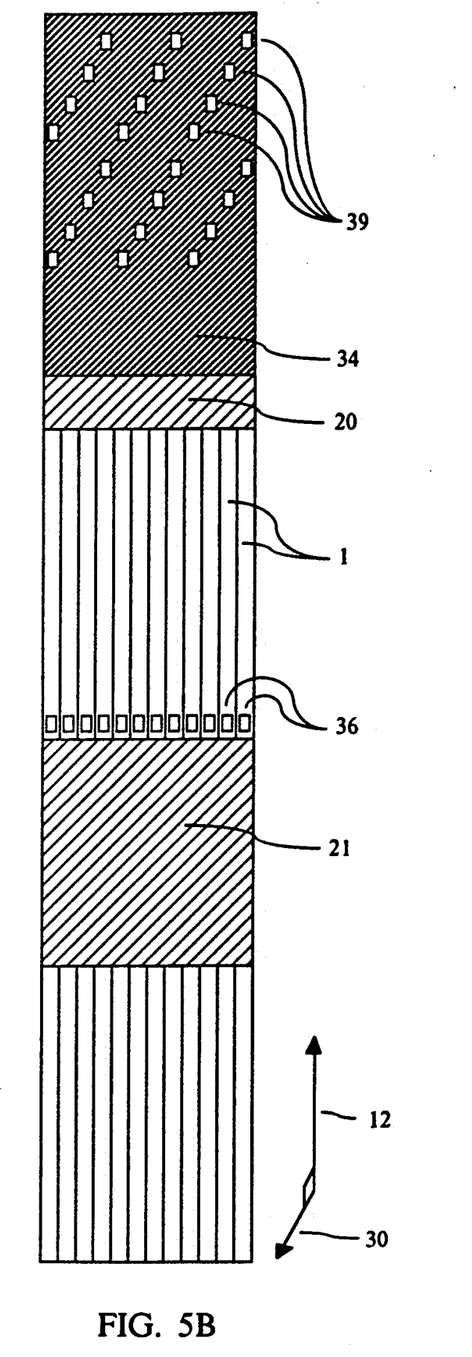
FIG. 5B is the light emitting side of the same ribbon in FIG. 5 showing the ground conductors and supercladding reflectors which direct light out from the waveguides to the viewer.
Figure 6:
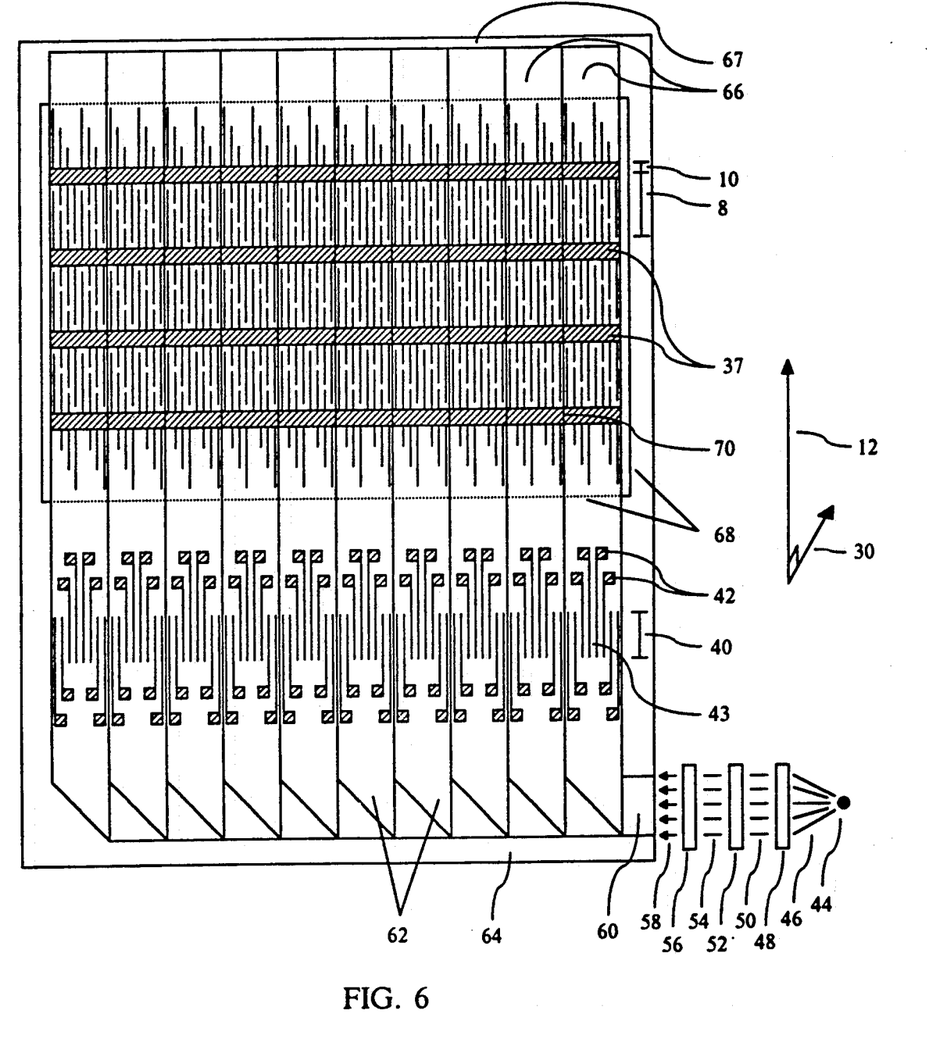
FIG. 6 is a rear view of a complete display comprising a light source, multiple ribbons which are folded and spread out side-by-side to cover a substrate.

In FIGS. 1A-1C the ground is 14 is connected to the bottom conductor 20 and the positive voltage 16, or signal, is connected to the top conductor 18. The connection of the ground 14 and voltage 16 to conductors 18 and 20 may be switched if desired. In fact, FIGS. 5 and 6 show layer 18 connected to ground 14 and layer 20 connected to the signal 16.

Staggered Taps on Multiple Waveguides

Figure 2A:
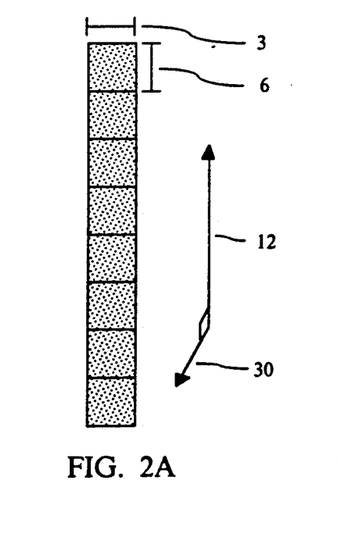
FIG. 2A is a schematic view of a single waveguide with multiple short interaction length taps placed at even intervals along its length.
Figure 2B:
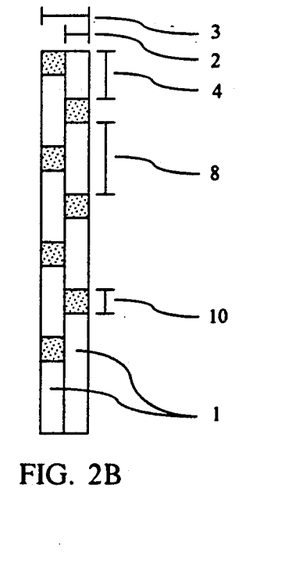
FIG. 2B is a schematic view of two waveguides with medium interaction length taps, and staggered reflectors, that when taken in combination, achieve the same adjacent pixel resolution as shown in FIG. 2A.
Figure 2C:
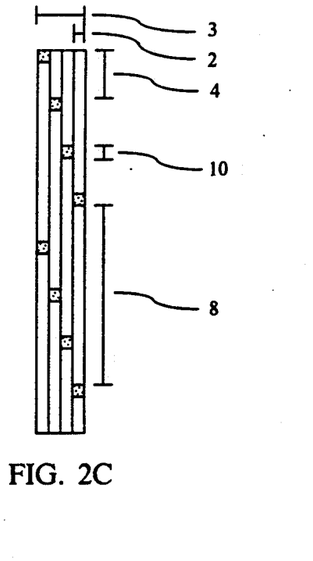
FIG. 2C is a schematic view of four waveguides with long interaction length taps, and staggered reflectors, which achieve the same adjacent pixel resolution as shown in FIG. 2A.

FIGS. 2A-2C show a schematic view of optical waveguide taps. The perspective in FIGS. 2A-2C is that of a viewer looking at the front of the display screen. If light were actually flowing direction 12 and emitted from the reflectors 30 shown in FIGS. 2B and 2C it would travel from the page toward the reader.

As previously mentioned, the small refractive index changes which can be achieved with acousto-optic, electro-optic and thermo-optic effects necessitate long tap interaction lengths. Long tap interaction lengths are needed to efficiently remove light from the waveguide. Short interaction length 8 taps can not remove enough core light to brightly illuminate screen pixels.

The total number of taps arranged along the length of a waveguide determines the resolution along one dimension of the display. Therefore, long tap interaction lengths 8 result in low screen resolutions. Consequently, there is a tradeoff between the screen resolution and the tap efficiency, or screen brightness. Long taps remove more light from the waveguide and are brighter. However, long taps cause the screen resolution to be low. Short taps increase the screen resolution, but at the expense of the screen brightness.

FIG. 2A shows a single waveguide with many short interaction length 6 taps. The only way to increase the resolution of a screen built with the waveguide shown in FIG. 2A is to decrease the tap interaction length 6. However, decreasing the tap interaction length 6 will decrease the efficiency of the taps.

FIGS. 2B and 2C show how to use multiple waveguides to achieve high screen resolutions with long interaction length taps. FIG. 2B shows two waveguides 1; each with half the width 2 of the single waveguide width 3 shown in FIG. 2A. The tap interaction length 8 plus the reflector region length 10 on each waveguide is twice as long as on the single waveguide shown in FIG. 2A. By staggering the interaction 8 and reflector 10 regions on two separate waveguides, the adjacent pixel spacing 4 is kept equal to the short tap interaction length 6 shown in FIG. 2A.

FIG. 2C shows how the tap interaction length increases when four waveguides are placed side-by-side. The interaction length 8 and reflector region 10 is twice as long as it is in FIG. 2B and four times as long as in FIG. 2A. Again, all of the light coupled out in the interaction region 8 is directed out of the waveguide at a reflector 10.

Many more than four parallel waveguides can be placed next to each other to achieve even longer interaction lengths 8. For example, if each reflector spacing 4 is 2 mm, each waveguide is 100 uM wide 2, and there are 20 waveguides in a column 3, the interaction 8 and reflector 10 length on each waveguide will be 40 mm. With these specifications a 500×500 element display screen can fit on a 1×1 meter substrate 64.

Staggering taps on separate waveguides causes consecutive pixels along the direction of light flow 12 to be horizontally displaced. Consecutive pixels in a column 3 have a "jagged" or "staircase" look because they are placed on separate, adjacent, waveguides. In addition, since the reflector size 10 gets smaller as more waveguides are placed next to each other, light emitted 30 from a reflector region 10 will appear as a small, point-like source.

To smooth the jagged, point-like, reflector appearance a diffusing material (not shown) may be positioned between the viewer and the reflectors 10. A diffusing material scatters reflector light and makes a larger light emitting area. Consequently, instead of a small point source, the diffusing layer causes reflector light to appear as a large, planar, light emitting area. Reflector light 30 traveling through the diffusing layer should exit with a lambertian intensity profile.

Reflector light scattered in the diffusing layer should be confined to a region with a width which equals all the parallel waveguides 1 in a column. For example, in FIGS. 2B and 2C, light emitted from a reflector 30 should illuminate an area in the diffusing layer equal to the column width 3. The length of the light diffusing region should equal the adjacent reflector spacing 4 or 6.

Reflector 30 light in the diffusing layer can be isolated by forming light barriers in the diffusing material. Light barriers are conveniently formed by molding, stamping or extruding a diffusing plastic to create optically separate scattering regions. In this way, screen pixels can be made which have large, sharply defined, light emitting areas.

Optical Waveguide Ribbon

Figure 3A:
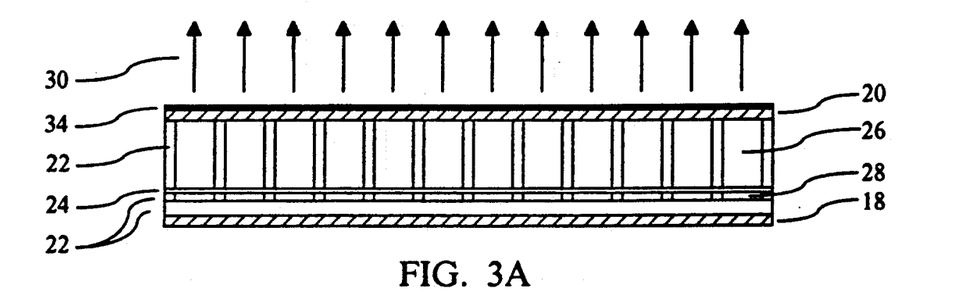
FIG. 3A is an end view of a ribbon containing multiple supercladding elements arranged on one side of multiple core elements.

FIGS. 3A-3B and 4A-4B show cross sections of four different types of optical waveguide ribbon. FIG. 3A, shows multiple waveguide ribbon cores 28 surrounded by cladding 22. A thin cladding layer 24 is positioned between the core 28 and the supercladding 26. The core is typically 1-200 uM thick. Light is coupled out of the cores 28, through the thin cladding 24, into the supercladding 26 and travels 30 to the viewer. As previously mentioned, the light coupling method may use evanescent field coupling, diffractive or other refractive effects.

A light absorbing material 34 is placed on one side of the ribbon to increase the screen contrast ratio. The light absorbing material can be placed on either side of the ribbon depending on how the reflectors 10 are formed in the supercladding. If the reflector is similar to the one shown in FIG. 1A, the light absorbing material 34 is placed on the top. If the tap is similar to the one shown in FIG. 1B, the absorbing layer 34 is placed on the bottom. The light absorbing material may be formed by anodizing, oxidizing, painting or covering electrodes 20 or 18.

Figure 3B:
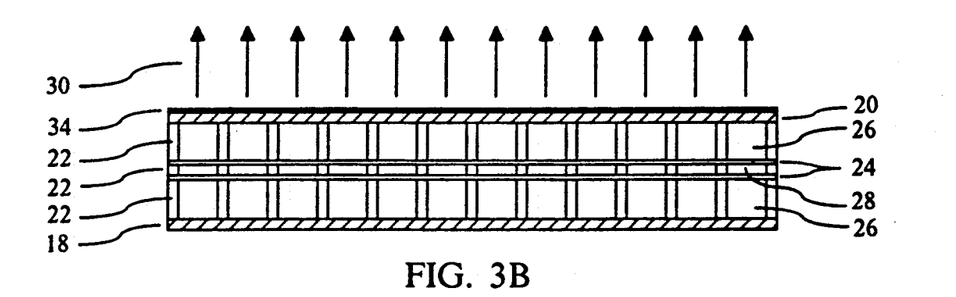
FIG. 3B is an end view of a ribbon containing multiple supercladding elements arranged on both sides of multiple core elements.

FIG. 3B is essentially the same as the ribbon in FIG. 3A, except for another supercladding 26 layer placed alongside the core elements 28. A thin cladding 24 and supercladding 26 is placed on each side of the core elements. The use of two supercladdings 26 reduces the tap interaction length 8 since guided light in the core 28 evanescently interacts more strongly with both supercladdings 26 through the two thin claddings 24. Dual reflectors like those shown in FIG. 1C are formed in both supercladdings 26 to direct supercladding light out to the viewer.

Figure 4A:
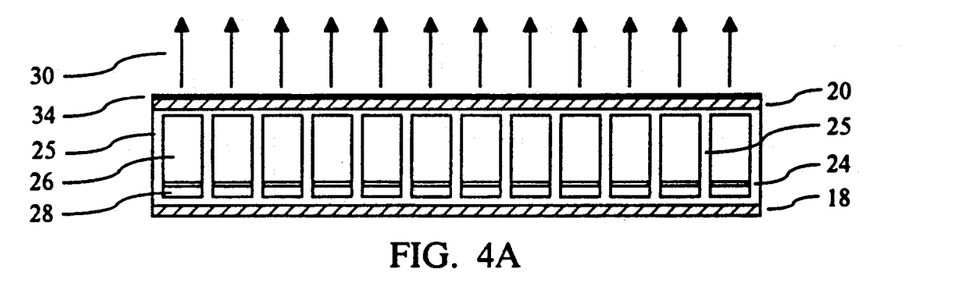
FIG. 4A is an end view of a ribbon containing multiple supercladding elements arranged on one side of multiple core elements such that the core, cladding and supercladding elements are isolated from each other.
Figure 4B:
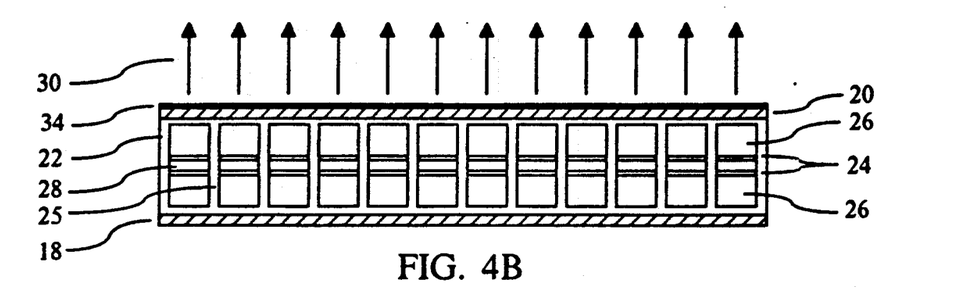
FIG. 4B is an end view of a ribbon containing multiple supercladding elements arranged on both sides of the ribbon cores where the core, cladding and supercladding elements are isolated from each other.

FIGS. 4A and 4B show waveguide supercladding 26, cladding 24 and core 28 elements which are separated from each other. Optical separation is achieved by interspacing a low-index cladding material 25 between the individual waveguide elements 26, 24 and 28. Optically separating 25 the supercladding 26 from the metal conductor 20 reduces the attenuation of tapped light guided through the supercladding.

When a tap or intensity modulator is "on", an electric field extends between the top 20 and bottom 18 conductors. In order for light to be removed from a single waveguide the electric field between the top 20 and bottom 18 conductors must be confined to the width 2 of a single waveguide. Electric field confinement may be improved by forming part, or all, of the waveguide separation elements 25 out of a conductive or metallic material.

Optical Waveguide Ribbon

FIGS. 5A-5B show the front and back of a segment of optical waveguide ribbon. In FIGS. 5A and 5B a plurality of optical waveguides 1 carry light direction 12. Light is first tapped out by intensity modulators 43 which have an interaction length 40 sufficiently long to remove all of the light traveling through the ribbon cores. Intensity modulator light is directed out at reflectors 36. Light exiting the supercladding at reflectors 36 is not intended to be directly viewed. The major function of the intensity modulator reflectors 36 is to remove light so it does not continue through the supercladding and interfere with the tap reflectors 39. Each intensity modulator controls the amount of light flowing through a single waveguide.

The taps 37 contain a series of staggered, long interaction length 8, fingerlike electrodes 38. As shown in FIGS. 2B and 2C, a high pixel resolution is achieved by staggering many long interaction length taps side-by-side next to each other. Supercladding light is reflected out of the reflectors 39 and travels to the viewer 30. Reflectors 39 are surrounded, but not covered, by a dark material 34 which covers the electrodes 18 or 20 to increase the screen contrast.

A tap ground conductor 20 runs vertically along the entire tap region of the ribbon. The intensity modulator ground conductor 21 is only as long as the interaction length 40 of the intensity modulators. The taps and intensity modulators are controlled by an electric field which extends through the ribbon between the control 40 and 37 and ground 20 and 21 electrodes. To prevent arcing, an insulator (not shown) may be placed over the intensity modulator and tap electrodes.

It is important to note the arrangement of the intensity modulator 43 bonding pads 42. Drive electronics must be attached to thousands of individual intensity modulators 43 in order to form screen images. However, the spacing between the intensity modulators electrodes 41 is very small. Intensity modulators are typically spaced 20 -200 uM apart.

When multiple ribbons are placed next to each other, the cumulative spacing error 41 between intensity modulators 43 placed on adjacent ribbons may become quite large. These ribbon spacing errors make the connection of control electronics more difficult to accomplish. Ideally, the screen drive electronics (not shown) are put on a single PC (printed circuit) board which is placed over all the intensity modulators on each separate ribbon. Electrodes on the bottom of the PC board contact the ribbon intensity modulator electrodes in a one-to-one correspondence.

However, if all the drive electronics are put on a single PC board, and side-by-side ribbon spacing errors are large, and unpredictable, a mismatch between the electrodes on the bottom of the PC board and intensity modulator electrodes 43 will occur. Large bonding pads 42 minimize drive electronic mismatch problems by reducing the attatchment tolerances between the PC board and the intensity modulators 43. Thus, a single PC board can be placed across many intensity modulators 43 on multiple ribbons which are irregularly spaced apart from each other.

The Complete Display

FIG. 6 shows a backside view of the entire diplay screen. The screen comprises multiple separate ribbons 66 that are initially stacked 60 on top of each other. Individual ribbons in the stack 60 are folded 62 over and fanned out, side-by-side, to cover a clear window 68 formed in the substrate 64. Light from a source 44 is focused 48 into a collimated beam 50, colored 54 and passed through a lens 56 focusing structure before entering 58 the ribbon cores 28.

Guided light traveling direction 12 first encounters the intensity modulators 43. Intensity modulators control the amount of light flowing through the waveguides 1 in direction 12 which reaches the taps 37. Light reflected out of the intensity modulators 36 is blocked by an opaque material deposited on the ribbon, or substrate 64, and is not seen by the viewer. Only when guided light reaches the taps 37 can it travel through the clear substrate window 68 to the viewer 30. Excess light reaching the end of the ribbons 67 is blocked and can not be viewed.

Both the intensity modulators 42 and tap 37 electrodes are formed on an exposed side of the waveguide ribbon. Exposing the electrodes simplifies the connection of the drive electronics to the intensity modulators and taps. In particular, a PC board and other opaque wiring can be placed directly on the backside of the ribbons without altering the viewing screen appearance.

Typically, tap conductors on adjacent ribbons 70 are connected together so they are electrically conductive. Inter-ribbon tap connection methods include solder re-flow, wave soldering, chemical vapor deposition, wirebonding, conductive epoxy and conductive tape. Connecting taps on adjacent ribbons reduces the number of separate wires which need to be connected to the drive electronics in order to control the taps.

In general, any transparent method can be used to affix ribbons to the substrate. For example, ribbons may be attached to the substrate by heat, pressure, epoxy, sticky materials or light catalyzed plastic. The preferred ribbon attachment technique utilizes a clear ultra-violet light polymerized plastic positioned between the waveguides 66 and the substrate 64.

Many different light sources 44 may be used to illuminate the screen. A few examples included xenon arc, quartz halogen, plasma, electroluminescent, laser, LED and long length strip sources. A xenon arc source is preferred because it produces a brilliant, small-size, light source which is easy to collimate. Also, the broad-spectrum output of a xenon arc lamp enables it to be used in color displays.

A number of different methods can be used to form color images. In general, the color emitted from the taps 37 is determined by the color of the light 58 traveling through the waveguides. Therefore, if the the light source 44 is monochromatic, the color emitted from the screen will be monochromatic. To make a color screen, different colors of light must travel through the waveguide cores 28.

One light coloring method relies on physically moving a coloring filter in front of a white light source. (not shown) In this scheme, a filter containing red, green and blue elements is attached to a voicecoil-like device and rapidly moved in front of a white light beam. Light passing through the moving filter is colored before entering 58 the ribbon cores. Full color screen images are created, one frame color at a time, as the filter moves in front of the source. This technique reduces the number of screen pixels needed to make a color display since each tap reflector emits 30 all three primary light colors in rapid succession.

A similar light coloring method is based on rapidly strobing multiple light sources. (not shown) Each light source is positioned to direct a different color of light into the ribbon cores. Different colors are strobed in rapid sequence to produce different color screen images, one frame at a time. By strobing three primary color lamps in succession a full color picture is generated.

Yet another possible light coloring method is coloring white light after it exits the reflectors 30. A color filter element is positioned between the ribbon, optional diffusing layer and substrate. (not shown) White light exiting the reflectors is passed through the coloring filter before reaching the viewer.

The power efficiency of the display is improved by positioning a focusing element 54 between the light source 44 and the ribbon stack 60. Without a focusing element 56, very little source light 44 will transfer into the ribbon cores 28. Unfocused source light will hit the ribbon supercladding 26 and cladding 24 layers and will be absorbed.

A graded index (GRIN) focusing lens is used to insure light from the source 44 is directed into the ribbon cores 28. GRIN lenses can focus a parallel beam of light to a very small size. GRIN lenses are commonly used to couple collimated laser light into single mode telecommunications fibers. Similarly, multiple GRIN micro-lenses may be positioned between the source 54 and the ribbons 60 to focus light 58 into the ribbon cores 28. Multiple GRIN lenses 56 can be formed separately, or fused into a single unit, and positioned in front of the ribbons in the ribbon stack 60.

To properly align the focusing lens 56, ribbons must be precisely stacked 60 on top of each another. Slight ribbon spacing irregularities make it difficult to align focused light 58 from the GRIN lens into the ribbon stack 60. To precisely space the ribbons apart, a spacing material (not shown) may be positioned between individual ribbons in the stack. The spacing material will insure each ribbon is flat and spaced a uniform distance apart from other ribbons in the stack.

A mechanical alignment system (not shown) can also help focus source light into ribbon cores. Many different mechanical systems may be envisioned which align and focus source light into the ribbon cores 28. For example, a devices which bends, compresses and/or dynamically adjusts the ribbon stack relative to the focusing optics can help insure proper light coupling.

The light source 44 shown in FIG. 6 is positioned to the side of the display. By bending the light path 46 with mirrors, prisms, fiber optics and/or lenses the light source 44 can be placed in different locations. For example, light can be guided a long distance to the screen by fiber optics. Or alternatively, the light source 44 can be placed in the front or back of the screen and directed into the ribbons by a prism or mirror. This flexibility in light source placement gives the screen designer many options to reduce and adjust the screen size.

Thermo-optic Taps and Ribbon

Figure 7A:
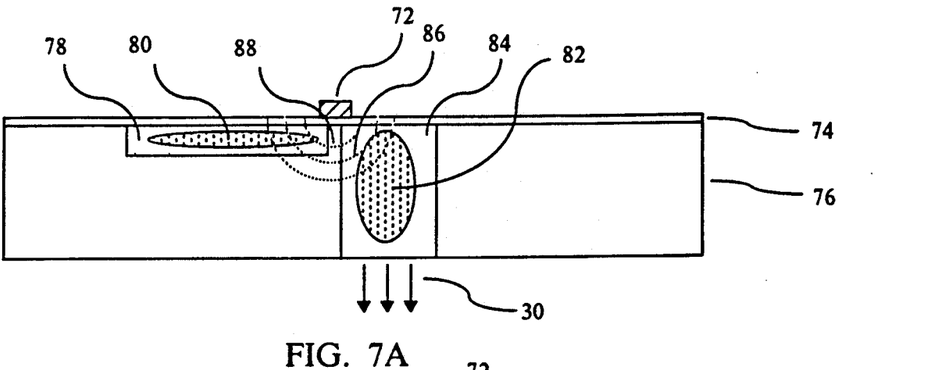
FIG. 7A shows a thermo-optic tap element which switches light by heating an element placed in close proximity to the core, cladding and supercladding elements.
Figure 7B:
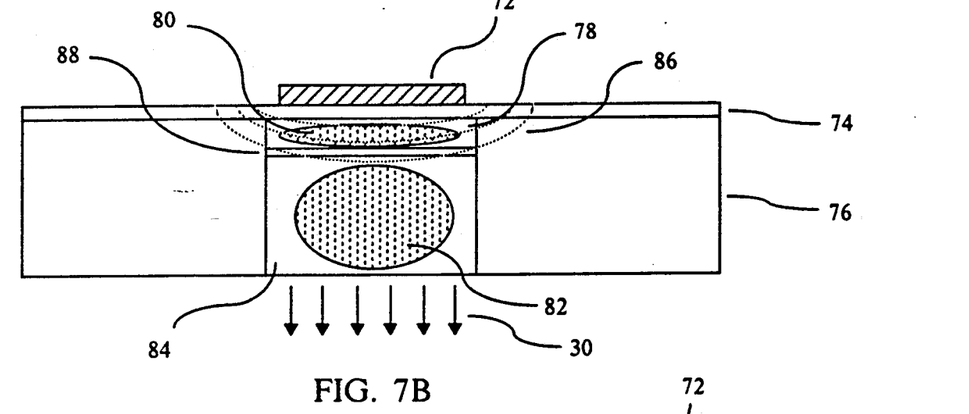
FIG. 7B shows a thermo-optic tap element which switches light by heating the cladding and supercladding elements through the core.

FIGS. 7A and 7B show end views of two types of thermo-optic waveguide taps. As mentioned in the section concerning the prior art, thin-cladding waveguides are sensitive to environmental temperature conditions. The light attenuation properties of thin-cladding waveguides vary greatly at different temperatures. Instead of limiting the usefulness of thin-cladding waveguides, this thermal sensitivity can be exploited to form active waveguide switching taps based on temperature induced optical effects.

Thermo-optic modulation effects in optical waveguides have been extensively studied. For example, M. Haruna and J. Koyama describe how to thermally modulate light in *Applied Optics*, Vol. 21, No. 19, Oct. 1, 1982, pp. 3461-3465, entitled "Thermooptic reflection and switching in glass". Also, M. Gottlieb and G. B. Brandt describe "Temperature sensing in optical fibers using cladding and jacket loss effects" in *Applied Optics*, Vol. 20, No. 22, Nov. 15, 1981, pp. 3867-3873.

FIG. 7A shows an end view of a single thermal waveguide modulator. A thermal heating element 72 is placed in contact with a structure containing waveguide core 78 and supercladding 84. The thermal heating element 72 is separated from the core 78 and supercladding 84 elements by an optional optical buffer layer 74.

Heat 86 from the heating element 72 changes the index of refraction in the region 88 between the core 72 and supercladding 84. Light 80 in the core 78 flows between the core 78 and supercladding 84 and travels 82 through supercladding until hitting a supercladding reflector and being deflected to the viewer 30. The supercladding 84 may have a graded index profile to insure supercladding light is removed from the heating region and interacts fully with the reflector.

FIG. 7B shows a different type of thermal waveguide modulator. In this configuration heat 86 must pass through the buffer layer 74 and core 78 before reaching the cladding 88. Heating the cladding 88 causes light to couple out from the core 78 into the supercladding 84 and travel to the viewer 30. This tap is slower than the one shown in 7A because heat 86 must travel further into the waveguide to modify the cladding 88 refractive index.

Figure 8A:
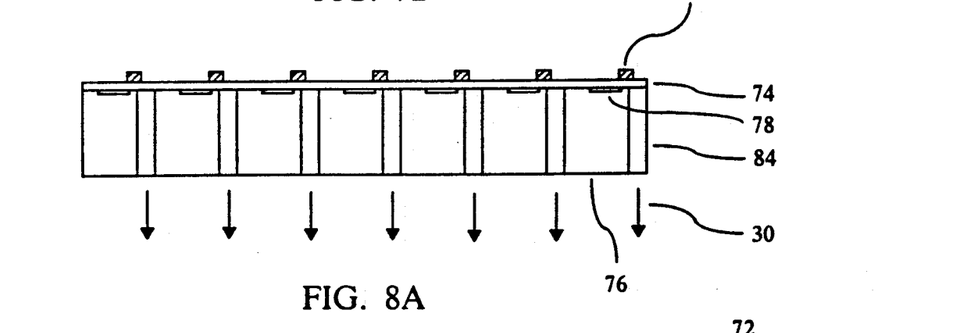
FIG. 8A shows a waveguide ribbon based on the thermo-optic tap shown in FIG. 7A.
Figure 8B:
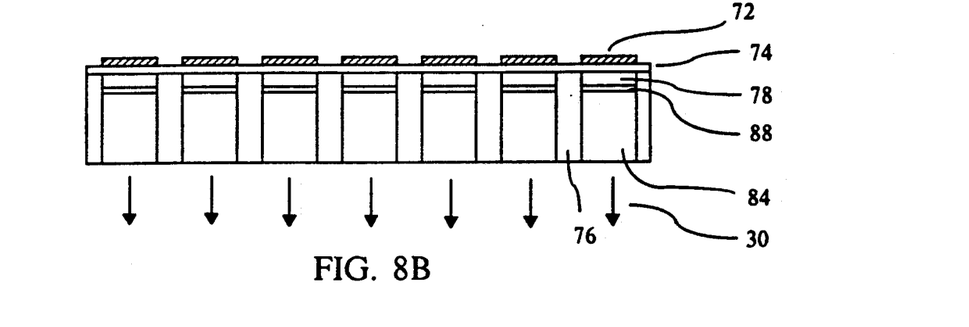
FIG. 8B shows a waveguide ribbon based on the thermo-optic tap shown in FIG. 7B.

FIGS. 8A and 8B show a profile view of thermo-optic waveguide ribbon. In FIG. 8A, multiple cores 78 are placed in close proximity to the heating element 78. Light in the core transfers across the cladding 88 into the supercladding 84. The waveguides and taps used in FIG. 8A are the same as those shown in 7A. The waveguides and taps used in FIG. 8B are similar those shown in 7B.

Thermo-optic taps and modulators tend to switch slowly. For example, the fastest modulators built by Hanura switch in $\approx 1$ msec. Normally, 1 msec would not be fast enough for use in an optical waveguide display. The minimum tap switching rate is determined by the following formula: Tap Switching Rate (in seconds)=1/(Number of taps along the waveguide * (Screen Updates/second)). Consequently, if 500 taps are placed along a length of waveguide, and the screen refresh rate is 30 updates/second, each waveguide tap must switch in 1/15,000 of a second, or 0.07 msec. This is much faster than the fastest 1 msec thermo-optic modulator reported by Hanura.

The staggered tap approach discussed in Section 2 significantly reduces the required tap switching speed. Adjacent pixels along the axis of light flow 12 are on separate waveguides and can be controlled in parallel. Parallel control of the taps and intensity modulators allow many screen pixels to be updated simultaneously. For example, if twenty waveguides are placed close next to each other to form a column 3, and each waveguide in a column contains 25 taps, the vertical column resolution still has 500 elements. If the screen refresh rate is 30 updates/second the individual waveguide taps need only switch at 1/750 of a second, or 1.3 msec. Thus, a high resolution screen can be built with low speed taps by using large numbers of parallel waveguides.

Materials and Manufacturing of Waveguides

Optical waveguides may be constructed from a number of different materials including silicon dioxide, glass, and polysioxane. Presently, waveguides based on plastics such as polymethyl methacrylate (PMMA), polystyrene, polyimide and polycarbonate are preferred. Plastics are important because they are easy to form and shape. Plastics can be extruded, rolled, laminated, stamped, pressed, spun, dipped, molded and drawn. In addition, waveguides can be formed in plastic materials by photolocking, thermo-poling, ion implantation, ion migration, etching, doping and machining.

Certain polymers also have very large electro-optic and ferroelectric properties. In fact, recently synthesized polymers have been reported which exhibit an electro-optic effect as large as $LiNbO_3$; an inorganic crystal with one of the highest electro-optic coefficients yet discovered. For example, a promising electro-optic polymeric material is discussed by J. R. Hill et. al., in a Sept. 1, 1988 *Journal of Applied Physics* article entitled "Demonstration of the linear electro-optic effect in a thermopoled polymer film".

This versatility makes plastics ideally suited as a waveguide building material. Critical waveguide elements, i.e.—the core and cladding, can be made from traditional polymeric waveguide materials such as PMMA and polysteren. The active waveguide switching elements, i.e.—the supercladding or cladding, can be made of new electro-optic polymer materials. Thus, plastics are useful in both passive and active waveguide switching elements.

There are many ways to form waveguides out of polymer materials. One method is called photolocking and was pioneered by E. A. Chandross and C. A. Pryde at Bell Laboratories. Photolocking is based on optically recording refractive-index patterns in polymer films. For example, a polymer base such as PMMA and a dopant can be cast from solution in a solvent to form a solid. Light from a laser beam, or other light source, is then used to expose the solid dopant and base. Exposure to light causes the dopant to photopolymerize and become locked to the base material. The residual dopant, which was not exposed to light, is evaporated out of the base by exposing the sample to heat. The regions where the dopant is locked to the base have a different index of refraction then the rest of the polymer.

Another polymer waveguide manufacturing approach is called thermopoling. This technique is described by J. I. Thackara et. al. in *Appl. Phys. Lett.*, 1988, 52, page 1031. In practice, electrodes are deposited on either side of a solid nonlinear or ferroelectric polymer. The polymer is then heated to its glass transition temperature and an electric field is applied to the electrodes in order to align the molecules in the softened polymer. The electrical ordering of the molecules causes the polymer between the electrodes to become oriented in the electric field and undergo a change in refractive index which follows the pattern of the electrodes. The polymer is then cooled, while maintaining the electric field. Once cooled, the electric field is removed and a permanent change in the index of refraction is "frozen" into the polymer. After thermopoling, some polymers may be piezoelectric in addition to being electro-optic.

Figure 9A:
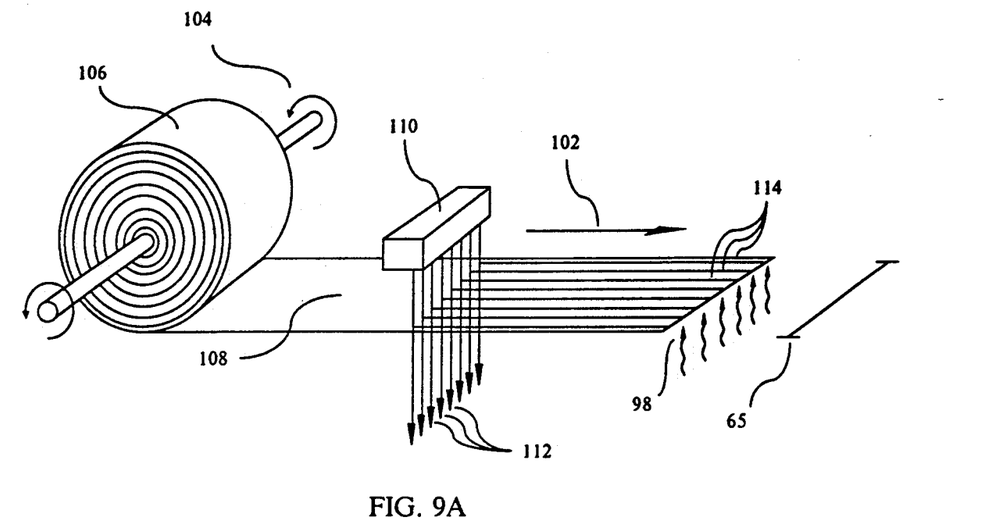
FIG. 9A shows a photolocking process used to manufacture optical waveguide ribbon.

Both photolocking and thermo-poling enable plastic waveguide ribbon to be economically manufactured. For example, many parallel waveguides can be exposed in thin plastic sheets by photolocking. FIG. 9A shows a thin plastic film 108 being exposed to parallel beams of light 112 in order to form parallel waveguides 114. After exposure to light, the film is heated 98 to fix and develop the waveguides. As a final step, (not shown) the film may also be laminated between two separate lower index sheets to form cladding layers.

Figure 9B:
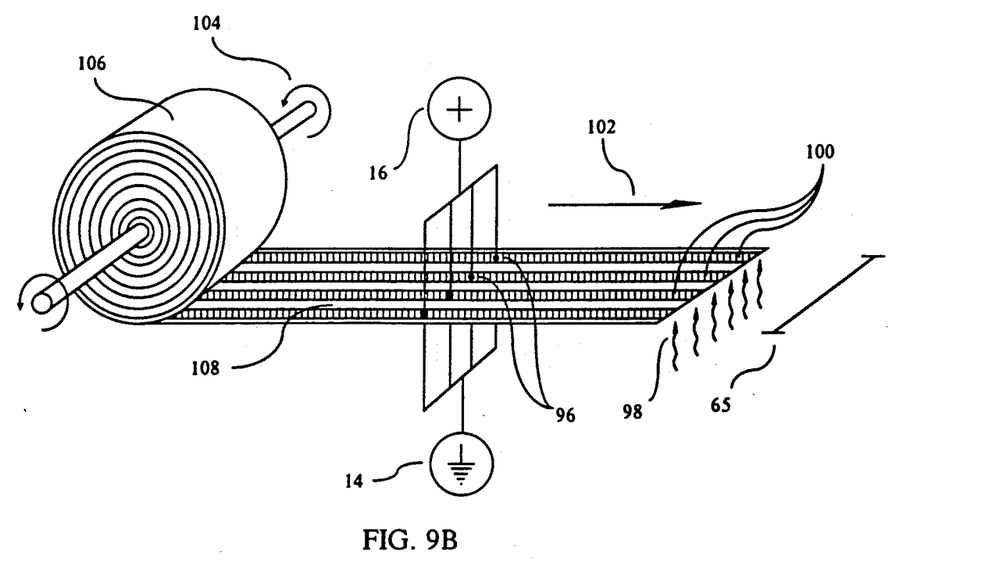
FIG. 9B shows a thermo-poling process used to manufacture optical waveguide ribbon.

As shown in FIG. 9B, thermo-poling can also be used to make economical plastic waveguide ribbon. Instead of using light to form waveguides, the film is heated 98 and exposed to an electric field 96, 16 and 14. A plastic film consisting of laminated electro-optic and non-electro-optic plastic layers is deposited with metal electrodes 100. Electrodes deposited on the laminated plastic film define waveguide regions. The entire laminated plastic/electrode structure is heated 98 while applying a voltage difference 16 and 14 to the electrodes. The electric field between the electrodes defines a high refractive index waveguide region in the electro-optic polymer layers.

The film used in thermo-poling or photolocking may consist of wide 65 sheets of plastic rolled onto spools 106. Automatic processing machines can form large numbers of waveguides in wide plastic sheets in parallel. Only after processing is it necessary to cut waveguide sheets down to smaller ribbon sizes.

In fact, it may not be necessary to cut wide 65 waveguide sheets into thin ribbons at all. If an inexpensive light source is developed which is extremely thin and long, light can be end-coupled into wide, un-cut, polymer waveguide sheets. Thus, instead of separate ribbons 66 which are initially stacked on top of each other 60, a single large waveguide sheet can be used to cover the display window 68.

Figure 10A:
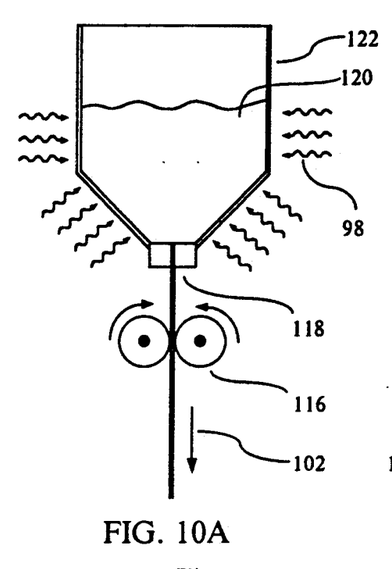
FIG. 10A shows a side view of a extrusion process used to manufacture waveguide ribbon.
Figure 10B:
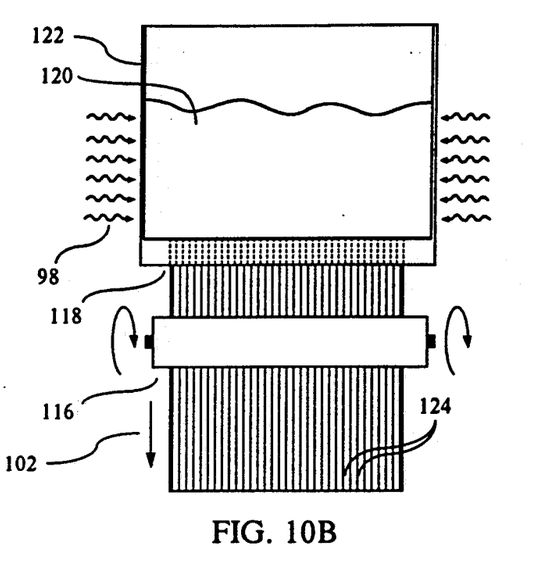
FIG. 10B shows a front view of the extrusion manufacturing process shown in FIG. 10A.

Extrusion is a different waveguide manufacturing technique. In FIGS. 10A and 10B a quantity of material 120 is heated 98 so it can be drawn 116 or pushed through an opening in a die 118. Very complicated shapes can be formed depending on the shape of the die 118 opening. A continuous, multi-step, polymer extrusion process may be used to form waveguide ribbon like that shown in FIG. 3A. Only one extrusion processing step is shown in FIGS. 10A and 10B.

Figure 11:
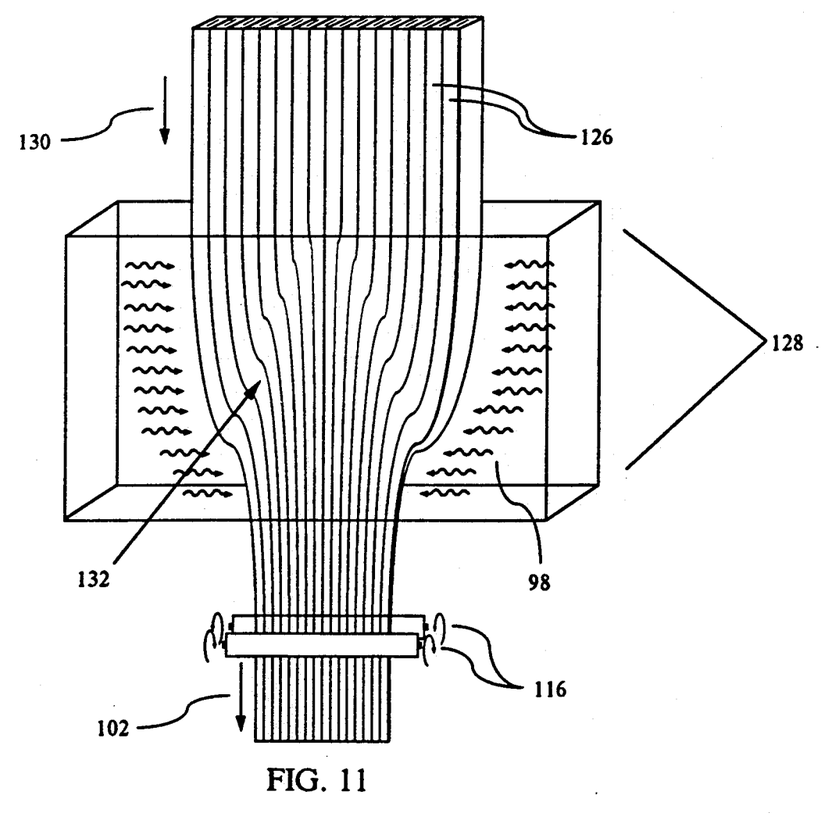
FIG. 11 shows a ribbon manufacturing process based on heating and drawing a ribbon preform containing multiple waveguide elements.

Traditional fiber drawing, as shown in FIG. 11, may also be used. Fiber preforms 126 larger than the size of the final fiber can be heated 98 and stretch down to a smaller size. Many individual preforms may be heated simultaneously and drawn down in parallel 132. The resulting plurality of individual fibers can be combined, either before or after the drawing process, into a ribbon-like structure.

Wide fiber preforms can cause the ribbon exiting the drawing process 102 to have a "bow-tie" shape. In other words, the waveguides at the edge of the ribbon are thicker than the waveguides in the center of the ribbon. This ribbon profile irregularity can be adjusted by controlling the pattern of the heat applied to the preforms 126 in the furnace 128. The sides of the furnace can be heated more than the center of the furnace. This will cause the stretched ribbon leaving the furnace 102 to have a more uniform, rectangular, profile.

Supercladding reflectors can be formed by chemical etching, laser burning, ion milling, and stamping. Presently, the preferred reflector fabrication method is chemical etching. A mask is deposited on the waveguide to define regions where material is to be removed. A high pressure gas, or other chemical etching means, removes optical material not covered by the mask. Reflector pits are formed in regions where supercladding material is removed. Ideally, etched reflector pits should be angled to reflect supercladding light out to the viewer.

A different reflector fabrication method is hot stamping. A heated plate with small protrusions can be stamped, or rolled, against the supercladding. Protrusions in the plate form indentations in the supercladding. These indentations subsequently can be coated, preferably metalized, to reflect light out of the supercladding. Hot stamping may also prove useful in creating large numbers of parallel optical waveguides in thin plastic sheets.

It is obvious that many combinations of the above techniques exist. For example, a preform containing a electro-optic plastic cladding can be stretch drawn into thin fibers. The fibers can then be thermo-poled to align the electro-optic material within the fibers. Or, ribbon can be be partially extruded, then heated and stretched, in a modified fiber drawing process. Since variations on the above techniques are too numerous to describe here, combinations of the aforementioned manufacturing techniques should be included within the scope of this patent application.

Driving the Intensity Modulators and Taps

Figure 12:
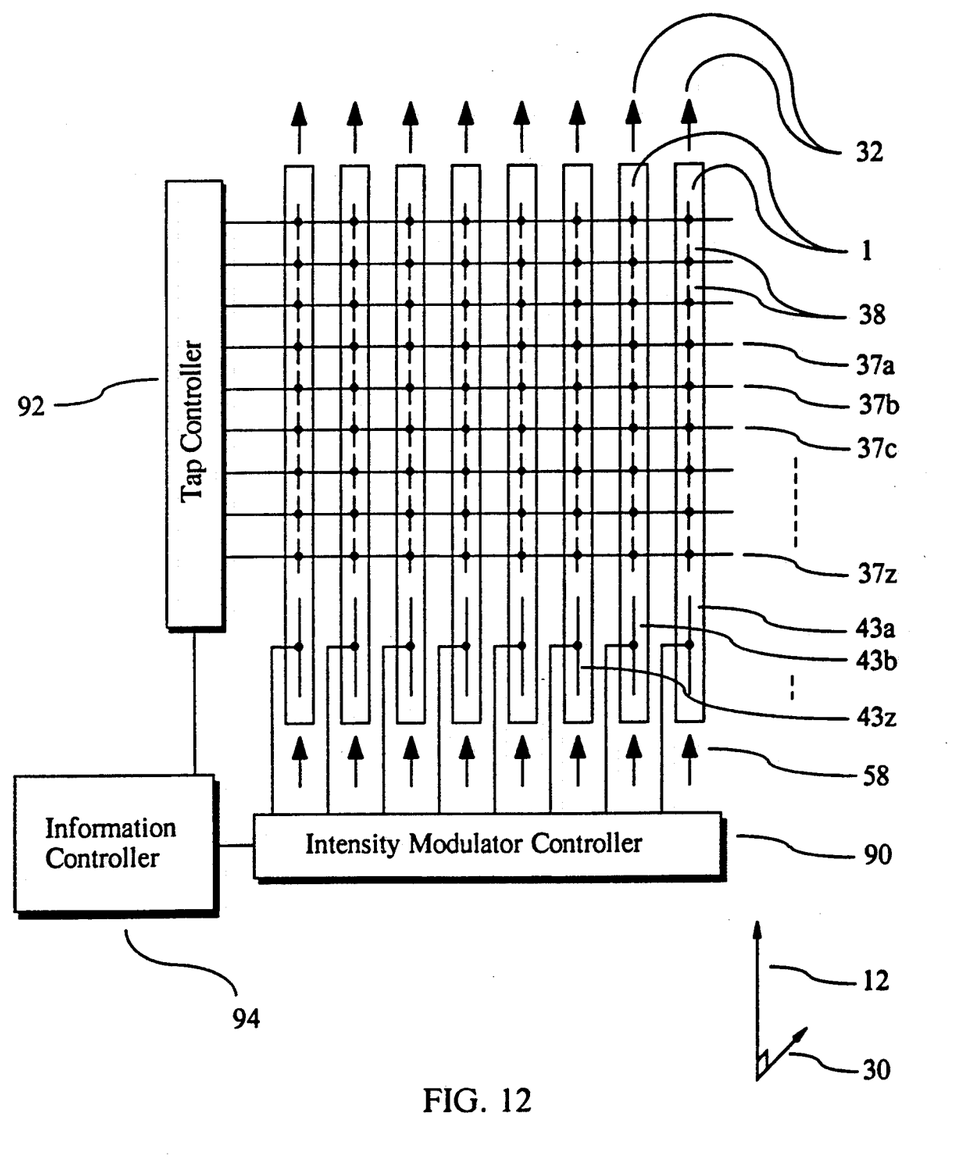
FIG. 12 shows a block diagram of a complete optical waveguide display system.

FIG. 12 is a schematic of the optical waveguide display. Video information passes through the Information Controller 94 and is used to drive the Tap Controller 92 and the Intensity Modulator Controller 90. The Tap Controller 92 selects a single tap row 37a, 37b, 37c ... or 37z. This causes light to exit the waveguides 1 at any selected tap row 37 and travel to the viewer 30. The amount of light flowing direction 12 through each waveguide 1 is controlled by the intensity modulators 43a, 43b ... 43z. The Intensity Modulator Controller 90 controls the intensity modulators 43 in parallel. Thus, when a particular tap row 37 is selected, the amount of light traveling through each waveguide 1 to the selected tap row is controlled by the intensity modulators. By rapidly cycling through all of the rows 37a, 37b, 37c ... 37z, and adjusting the intensity modulators 43a, 43b ... 43z in parallel, complete screen images are formed.

RAMIFICATIONS AND CONCLUSIONS

While this application contains many specifics, the reader should not construe these as limitations on the scope of the invention. Rather, they are merely exemplifications of the preferred embodiments. Those skilled in the art will envision variations and improvements which are apparent given the ideas presented here.

For example, electro-optic taps which use liquid crystals may be employed. In the presence of an electric field liquid crystal materials undergo a large change in their refractive index. Thus, a liquid crystal layer oriented alongside a waveguide can be used to switch light out of the core. In particular, liquid crystal polymers with second order effects using pendant side chain groups are of considerable interest.

As discussed in the parent application, acousto-optic taps may also be used. Sound generated from a poled piezoelectric polymer such as Polyvinylidenefluoride (PVDF) can be launched into a plastic cladding, glass core, waveguide. Sound is reflected between the glass core and the PVDF transducer and, if the frequency is properly adjusted, can cause a resonance to be generated in the plastic cladding. Generating a cladding resonance lowers the tap drive power by reusing acoustic energy already transmitted into the waveguide. This makes the acousto-optic tap more efficient.

All the waveguides shown in this application are either square or rectangular. Other waveguide profiles which are circular, triangular, hexagonal or which have rounded corners may be substituted instead. In general, any waveguide profile capable of guiding light can be used.

The specific electronic control systems needed to orchestrate the many intensity modulators and taps have not been specified. Obviously, many different types of well-known electronic components and circuits can be used to control the intensity modulators and taps. For example, in the case of electro-optic taps, a high voltage DC signal may need to be applied to the tap and intensity modulator conductors. Or in the case of acousto-optic Bragg diffraction taps, high frequency signals will need to be applied. It may also be necessary to place memory on the screen to buffer and store a full frame image. Furthermore, special circuits may be required to provide power to the light source and drive electronics. The circuits which apply and co-ordinate electrical signals to form screen images are clearly implied by what has been taught and should be included within the scope of the invention.

Due to manufacturing irregularities, individual waveguides will attenuate light at different rates. Irregular waveguide losses can cause the screen image to have an uneven brightness which varies across the surface of the screen. Thus, it may be necessary to electronically adjust the amount of light flowing through each waveguide separately to make a screen image with uniform brightness.

Multiple illumination sources and multiple ribbons can be used to illuminate the panel. For example, by placing large numbers of ribbons side-by-side extremely large screens can be constructed. Multiple light sources will be required to supply light to the many waveguide ribbons used in such extremely large size screens.

Some illumination sources produce excess heat which can damage screen components. For example, a plastic ribbon will easily melt if placed too close to a hot xenon arc lamp. A means must be provided to control excess heat, especially heat generated from the light source. For example a fan, liquid radiator, semiconductor and/or passive convection cooling system may be added to the system to control screen temperatures.

An acoustic speaker can be placed behind the screen to generate audible sound. If the screen is made very thin, sound from a speaker mounted directly behind the screen can propagate relatively undistorted through the screen to the viewer. Placing the speaker behind the display will give the viewer the impression that sound is coming from pictures and images presented on the screen.

Optical waveguide screens, unlike other popular flat panel approaches, are unique in their ability to be manufactured thin enough to be acoustically transparent. Placing the speaker behind the screen will be particularly important as the size of flat display screens increases. Speakers can not be placed at the periphery of large screens without changing the perceived spacial imaging of sound hear by the viewer.

Although the invention is described principally as a method to display images, some techniques which form part of the invention have novelty of their own. In particular, long interaction length electro-optic waveguide taps combined with reflectors are believed to be contributions quite different from the prior art. Individual waveguide fibers using this configuration may find use in telecommunication systems.

While the invention has been described with reference to a preferred embodiment thereof, it will be appreciated by those of ordinary skill in the art that changes can be made to the structure and function of the parts without departing from the spirit and scope of the basic invention. Accordingly, the reader should help determine the scope of the invention by the appended claims and their legal equivalents, and not solely by the examples which have been given.

I claim:

1. A visual optical switching element comprising:
   a first elongated transparent optical material,
   a second elongated optical material,
   said first and said second optical materials arranged alongside each other,
   a light source positioned in a light coupling relationship to said first elongated optical material,
   a means for causing some of the light traveling through said first optical material from said light source to exit selectively into said second optical material so light can be observed by a viewer,
   a means of altering the path taken by light traveling through said second optical material,
   said path altering means consisting of a plurality of abrupt discontinuities formed in said second optical material.

2. The visual optical switching element as claimed in claim 1 in which said abrupt discontinuities comprise indentations formed in at least one part of the surface of said second optical material.

3. The visual optical switching element as claimed in claim 2 in which said indentations are at least partially covered with a light reflective material.

4. The visual optical switching element as claimed in claim 2 in which said indentations are filled with a light scattering material.

5. The visual optical switching element as claimed in claim 1 in which said first optical material comprises an optical waveguide.

6. The visual optical switching element as claimed in claim 1 in which said second optical material guides light from said first optical material a substantial distance before reaching an abrupt discontinuity.

7. The visual optical switching element as claimed in claim 1 in which said selective light exiting means is one of electro-optic, acousto-optic, magneto-optic, and thermo-optic devices.

8. A display system comprising:
   a plurality of parallel optical waveguides,
   a plurality of controllable light emitting regions of approximately uniform size and shape,
   said controllable light emitting regions spaced apart along the length of each individual waveguide in said plurality of optical waveguides,
   said controllable light emitting regions offset a distance oriented along the direction of light travel through said plurality of waveguides such that said light emitting regions associated with adjacent waveguides are not situated directly next to each other.

9. The display system as claimed in claim 8 in which said controllable light emitting regions are approximately the size of the core diameter of the individual waveguides in said plurality of waveguides.

10. The display system as claimed in claim 9 in which said controllable light emitting regions are spaced relatively far apart along the length of the waveguides when compared with the size of the light emitted from said controllable light emitting regions.

11. The display system as claimed in claim 8 in which said controllable light emitting regions is one of acousto-optic, electro-optic, thermo-optic and magneto-optic devices.

12. The display system as claimed in claim 9 in which light from said controllable light emitting regions is passed through a light diffusing material.

13. The display system as claimed in claim 8 in which light from said light source is directed into the cores of said plurality of waveguides with at least one graded index lens.

14. A display system comprising:
   a plurality of parallel optical waveguides,
   a plurality of controllable light emitting regions of approximately uniform size and shape,
   said controllable light emitting regions spaced apart along the length of each individual waveguide in said plurality of optical waveguides, in which said controllable light emitting regions are staggered on separate waveguides so high screen area pixel resolutions can be achieved while using long interaction length taps.

15. The display system as claimed in claim 14 in which said controllable light emitting regions are one of electro-optic, acousto-optic, magneto-optic, and thermo-optic devices.

16. A display system comprising:
a plurality of solid optical waveguides,
a light source positioned in a light coupling relationship to said plurality of optical waveguides,
and a thermo-optic light exiting means for causing a portion of light traveling through said plurality of solid optical waveguides to exit selectively so light can be viewed at selected locations oriented along the lengths of the waveguides in said plurality of waveguides.

17. The display system as claimed in claim 16 in which a controllable heating element is placed in proximity to said plurality of solid optical waveguides.

18. The display system as claimed in claim 16 in which said thermo-optic light exiting means comprises two waveguides which are placed in close proximity.

19. The display system as claimed in claim 18 in which a controllable heating element is placed in proximity to said two waveguides.

20. The display system as claimed in claim 18 in which light is abruptly removed from one of said two waveguides.

21. A display system comprising:
a plurality of regularly spaced parallel optical waveguides,
a plurality of separate electrodes which control the amount of light flowing through said plurality of optical waveguides,
each individual electrode in said plurality of separate electrodes configured to only control the amount of light flowing through a single waveguide in said plurality of optical waveguides,
said plurality of separate electrode elements shaped so the electrode extends a distance normal to the direction of light flow through said plurality of optical waveguides,
said electrode distance exceeding the closest distance separating two adjacent parallel waveguides in said plurality of regularly spaced optical waveguides.

22. The display as claimed in claim 21 in which said electrodes are opaque.

23. The display as claimed in claim 21 in which said electrodes are transparent.

* * * * *